M. D. SKINNER.
APPARATUS FOR REMOVING THE PITS FROM CHERRIES AND OTHER FRUITS.
APPLICATION FILED SEPT. 27, 1919.
1,363,680.
Patented Dec. 28, 1920.
3 SHEETS—SHEET 1.
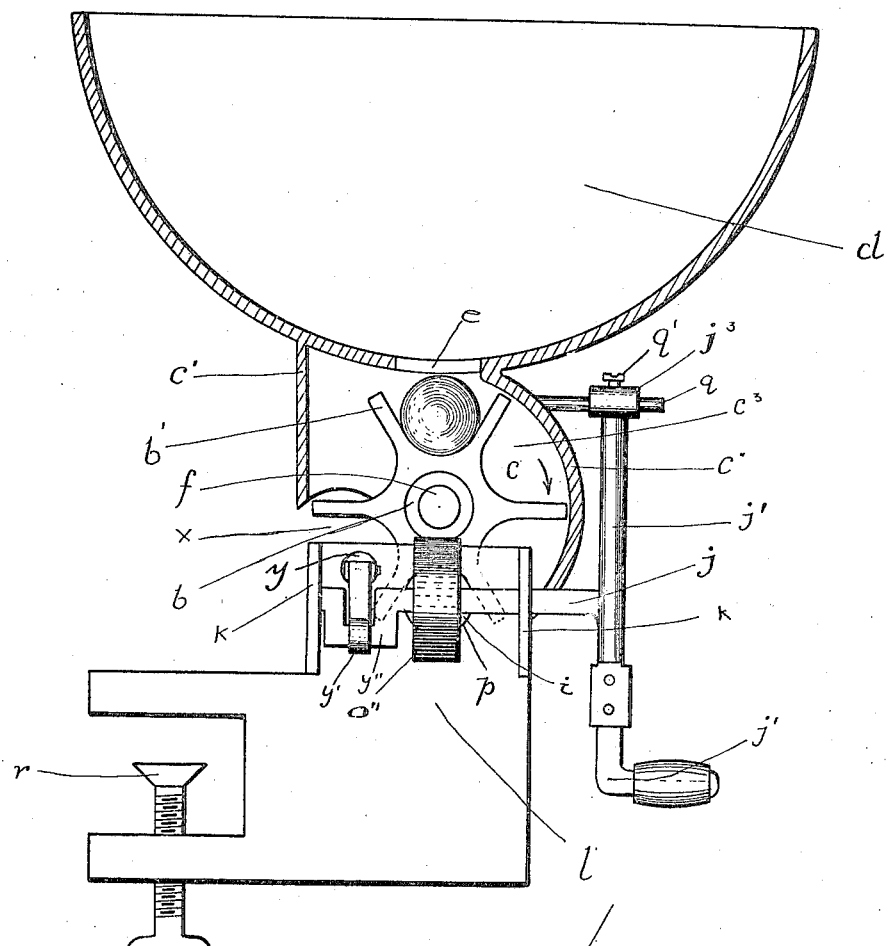
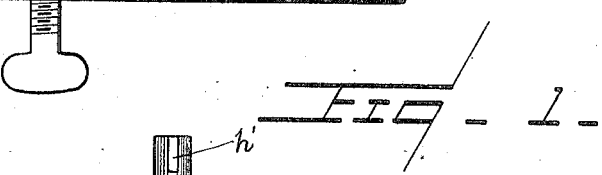
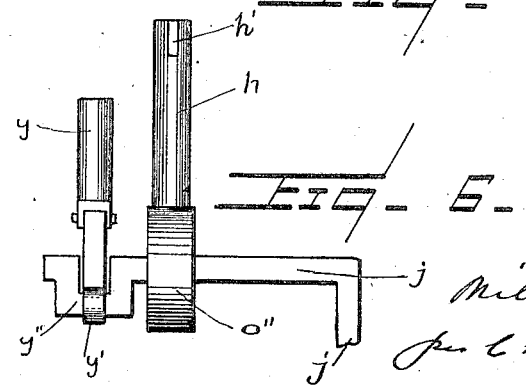

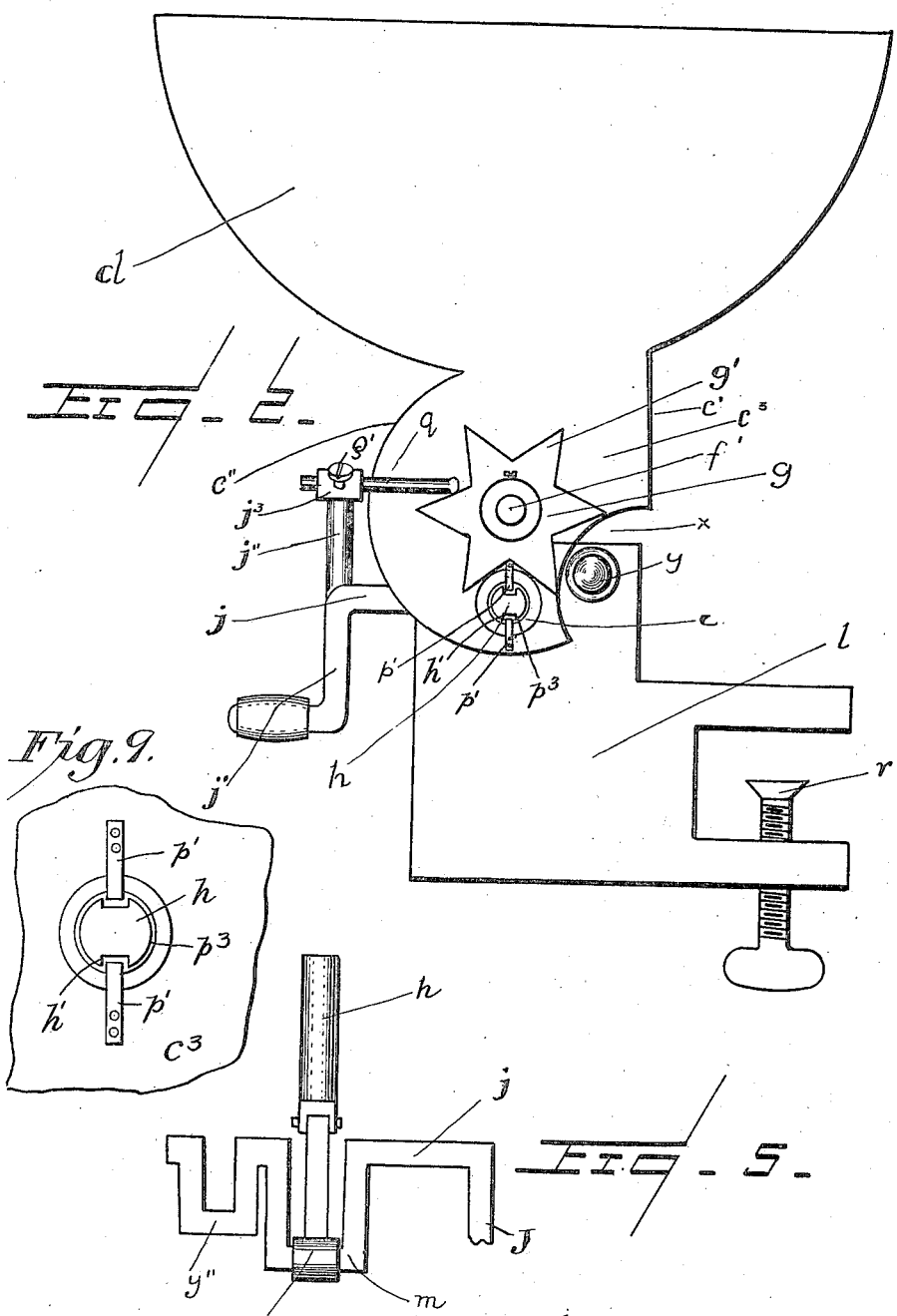

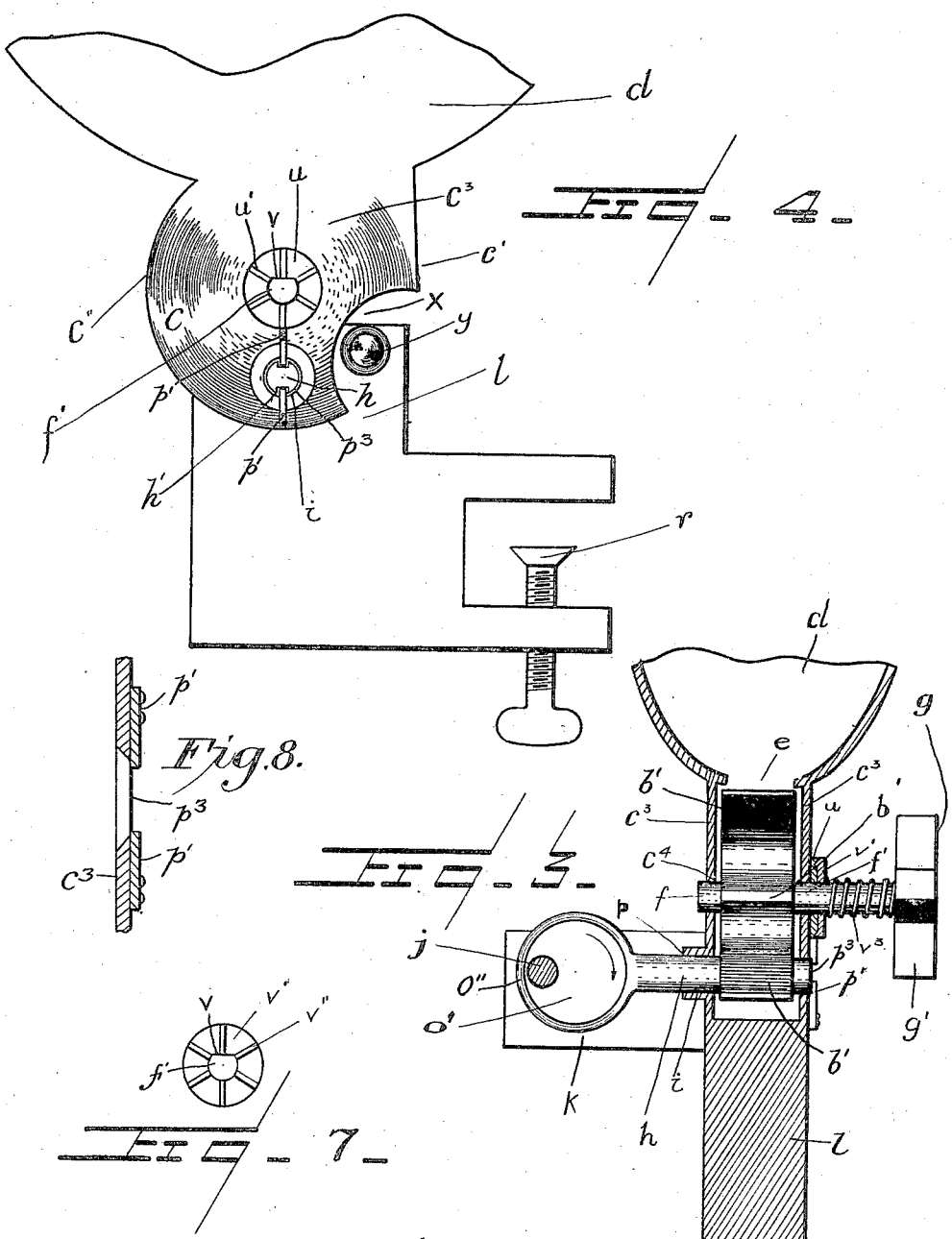

UNITED STATES PATENT OFFICE.

MILTON DOUGLAS SKINNER, OF PORT CREDIT, ONTARIO, CANADA.

APPARATUS FOR REMOVING THE PITS FROM CHERRIES AND OTHER FRUITS.

1,363,680.	Specification of Letters Patent.	Patented Dec. 28, 1920.

Application filed September 27, 1919. Serial No. 827,003.

*To all whom it may concern:*

Be it known that I, MILTON DOUGLAS SKINNER, of Port Credit, in the county of Peel and Province of Ontario, Dominion of Canada, have invented certain new and useful Improvements in an Apparatus for Removing the Pits from Cherries and other Fruits; and I hereby declare the following to be a full, clear, and exact description of the same.

This invention relates to an apparatus for removing the pits from cherries and other fruits without destroying the texture of the flesh, and it consists essentially of a reciprocating punch, an intermittently rotating feed wheel for delivering the fruit to the punch, and operable means actuating the punch and causing the intermittent rotation of the feed wheel, a suitable housing being provided for the feed wheel and the reciprocating punch, as hereinafter set forth and particularly pointed out in the claims.

In the drawings:

Figure 1, is a sectional elevation of the apparatus,

Fig. 2, is an elevation of the apparatus looking at the opposite side to Fig. 1, Fig. 3, is a sectional elevational view of the apparatus at right angles to Fig. 2, Fig. 4, is a view similar to Fig. 2 with the timing wheel and its related parts omitted.

Fig. 5, is a detail view of the punch, ejector and crank shaft,

Fig. 6, is a detail view showing an eccentric shaft for operating the punch, and Fig. 7, is a detail view of the locking washer, Fig. 8, is a fragmentary section of the housing showing the ejection aperture for the pit and the means for removing it from the punch, and Fig. 9, is a fragmentary elevation of the construction shown in Fig. 8.

The essential parts of this apparatus are the reciprocating punch, the intermittently rotating feed wheel and operable means for actuating the punch and causing the intermittent rotation of the feed wheel.

The feed wheel shown in Fig. 1, consists of a hub $b$, and a set of arms $b'$, radiating from the hub, to receive in the intervals between them the fruit to be carried to the punch.

Inclosing the feed is a hollow housing $c$ of such shape and dimensions as to provide for the free revolution of the feed wheel and its load, this housing forming part of the frame $l$ of the apparatus.

A convenient form of housing is that shown in the drawings which comprise a vertical side $c'$, a curved side $c''$ opposed to the vertical side $c'$ and two end sides $c^3$, the arc of the curved side being concentric with the feed wheel and its radius being slightly greater than that of the radial arms $b'$.

At the top of the housing is a hopper $d$ to contain the fruit and formed through the bottom of the hopper is a gateway $e$ for the passage of the fruit from the hopper to the interior of the housing, the dimensions of the gateway being sufficient to permit the fruit passing therethrough in single number only.

For the rotation of the feed wheel, its hub $b$ is provided with journals $f\ f'$ mounted in bearings $c^4$ in the sides $c^3$ of the housing, beyond one of which the corresponding journal $f'$ extends, and keyed or otherwise secured on this journal exteriorly of the housing is a timing wheel $g$ having a set of arms $g'$, corresponding in number and location with the radial arms $b'$ of the feed wheel.

During the rotation of the feed wheel the intervals between the arms $b'$ successively come into line with the gateway $e$, to receive and carry the fruit forward to the position, where the pit is removed, which in this case is at the bottom of the vertical axis of the feed wheel, the radial arms being preferably of a width corresponding to the lateral distance between the sides $c^3$ of the housing and of such length with regard to the diameter of the curved side $c''$, as to prevent the displacement of the fruit in a circumferential direction, the sides $c^3$ preventing its displacement in a lateral direction.

In line with the position where the pit is pressed out is a reciprocating punch $h$, which moves transversely through the housing and the intervals between the radial arms when they arrive at this position.

To maintain the reciprocating movement of the punch in a fixed path the frame $l$ is provided with a guideway $i$, of corresponding cross sectional shape and dimensions to the punch.

A shaft $j$ is mounted in bearings $k$ in the frame $l$, and is provided with means for reciprocating the punch which means as shown in Fig. 5, may consist of a crank $m$ connected by a link $o$, with the punch $h$, or as shown in Figs. 1, 3 and 6, may consist of an eccentric $o'$, operating in an eccentric strap $o''$ to which the punch is connected, or may consist of other suitable mechanical elements within the scope of the claims, which will impart a reciprocating movement to the punch.

Formed through the housing in line with the punch are apertures $p$, $p^3$, of corresponding diameter to the punch, and in the peripheral surface of the punch $h$ are axial grooves $h'$. Secured to the side $c^3$ of the housing remote from the shaft $j$ are spring dogs $p'$, the free ends of which enter these grooves.

Fixed on the shaft $j$ is a crank $j'$, or other suitable device for causing its revolution and attached to the crank $j'$ is an arm $j''$ having a collar $j^3$, the axis of which is parallel with that of the shaft $j$, which at each revolution of this shaft comes into line with one of the arms $g'$ of the timing wheel $g$.

Inserted through the collar $j^3$ is a timing rod $q$ held by a set screw $q'$, which permits of the lengthwise adjustments of the rod $q$ to the timing wheel, so that it will engage one of its arms on each revolution of the shaft $j$.

The frame $l$ is shown to be provided with a clamp $r$ by which it may be secured to a table or bench but instead of the clamp the frame may be provided with a suitable base when the apparatus is constructed for power purposes.

The fruit, for instance, cherries, are deposited in the hopper $d$ and descend one at a time through the gateway $e$ into the housing $c$, and enter the intervals between adjacent arms $b'$, when the intervals come into line with the gateway. The revolution of the feed wheel carries the fruit in the direction indicated by arrow in Fig 1, to the position where the pits are removed, the radial arms $b'$ of the feed wheel and the curved side $c''$ of the housing preventing the displacement of the fruit in a circumferential direction and the sides $c^3$ preventing its displacement in a lateral direction.

The revolution of shaft $j$ imparts the reciprocating movement to the punch $h$, causing it to pass through the apertures $p$, $p^3$, in the housing and through the fruit which at the time being is at the position where the pit is removed, the punch then pressing the pit from the fruit and forcing it through the aperture $p^3$ in the side $c^3$, remote from the shaft $j$, the inner surface of this aperture $p^3$ being beveled to facilitate the passage of the pit therethrough.

During the outward movement of the punch with the pit through the aperture $p^3$, the dogs $p'$ spring outward to clear the pit, and then spring back to their normal position to reënter the grooves so that during the return of the punch they will engage the pit, should it adhere to the punch, and separate it from the punch before the punch is retracted within the housing, thus clearing the punch for its next operation.

During the reciprocating movement of the punch the pit is pressed from the fruit, forced through the aperture $p^3$ in the side $c^3$ of the housing, and then separated from the punch during its reverse movement by the dogs $p'$.

When the punch has been retracted to its starting position the timing rod $q$ engages one of the arms $g'$ of the timing wheel $g$, and rotates it a distance equal to the subdivision of the circle of revolution represented by that arm, the punch in its starting position being clear of the feed wheel for the rotation of the latter.

The timing wheel shown in Fig. 2, is provided with six arms $g'$, and the feed wheel shown in Fig. 1, is provided with six radial arms corresponding in location with the arms of the timing wheel.

As both the timing wheel and feed wheel are fixed on the axle or journal $f'$ the partial revolution of the timing wheel imparts at each revolution of the shaft $j$, a corresponding movement to the feed wheel, equal in this case to one-sixth of the complete circle of rotation. This causes the intermittent rotation of the feed wheel to bring the intervals between each adjacent pair of spokes successively into line with the gateway to receive the fruit, and then to bring the fruit into line with the punch, which when actuated, presses the pit from it.

When the punch has pressed the pit out of the fruit and has been again retracted to its normal position, the feed wheel continues its intermittent rotation and brings the fruit to the ejecting position where it passes out of the ejector opening or gateway $x$ in the housing, the ejectment being effected by a reciprocating ejector $y$ connected by a link $y'$ with a crank $y''$ on the shaft $j$.

To prevent the feed wheel inadvertently moving past the position where the pit is removed, the housing is provided with a stationary lock $u$ having a corrugated or grooved face $u'$, and the journal $f'$ is formed with a flattened surface $v$, adjacent to the lock, and a washer $v'$, slidable lengthwise of the journal, is mounted thereon, this washer having projections $v''$ to enter the grooves or corrugations in the lock $u$. Encircling the journal $f'$ is a spring $v^3$ bearing against the timing wheel and against the washer $v'$ to yieldingly press this washer into engagement with the lock $u$, for the entry of the projections into the corrugations.

When the timing wheel and journal $f'$ are turned for the step by step rotation of the feed wheel, the spring yields sufficiently to allow the washer $v'$ to move lengthwise on the shaft for the projections $v''$ to clear the grooves or corrugations in the lock $u$, but without moving them out of contact with the lock $u$, so that when the turning power is removed the projections will enter the corrugations or grooves opposed to them and arrest the further revolution of the feed wheel, and hold it until the timing wheel is again rotated.

Having thus fully described my invention, what I claim as new and desire to secure by Letters Patent is:

1. An apparatus for removing pits from fruit, comprising a housing and a hopper for containing the fruit to be pitted, a feed wheel journaled in the housing adapted to carry the fruit from the hopper to the pitting position, journals for the feed wheel, one of which extends beyond the housing, a timing wheel mounted on said journal, a punch operable through the housing transversely to the direction of rotation of the feed wheel, a rotatable shaft, means transmitting motion from the shaft to the punch, an arm rotatable with the shaft and a timing rod carried by said arm to rotate, step by step, the timing and feed wheels.

2. An apparatus for removing pits from fruit, comprising a housing and a hopper for containing the fruit to be pitted, a feed wheel journaled in the housing adapted to carry the fruit from the hopper to the pitting position, journals for the feed wheel, one of which extends beyond the housing, a timing wheel mounted on said journal, a punch operable through the housing transversely to the direction of rotation of the feed wheel, a rotatable shaft, means transmitting motion from the shaft to the punch, an arm rotatable with the shaft and an ejector for the pitted fruit actuated by the shaft.

3. An apparatus for removing pits from fruit, comprising, a housing, feed means intermittently rotatable therein, reciprocating means for pressing the pits from the fruit movable transversely through the housing and feed means, and means actuating the reciprocating means and imparting intermittent rotation to the feed means to advance the fruit step by step to the reciprocating means, and means for removing the pit from the reciprocating means on its return movement.

4. An apparatus for removing pits from fruit, comprising, a housing, feed means intermittently rotatable therein, a reciprocating punch for pressing the pits from the fruit movable transversely through the housing and feed means, and means actuating the punch and imparting intermittent rotation to the feed means to advance the fruit step by step to the punch, the peripheral surface of the punch being axially grooved, and means entered in said grooves for removing the pits from the punch.

5. An apparatus for removing pits from fruit, comprising, a housing, feed means intermittently rotatable therein, a reciprocating punch for pressing the pits from the fruit movable transversely through the housing and feed means, and means actuating the punch and imparting intermittent rotation to the feed means to advance the fruit step by step to the punch, the peripheral surface of the punch being axially grooved, and means entered in said grooves for removing the pit from the punch, said means consisting of spring dogs secured to the housing.

Toronto, Ontario, August 28th, 1919.

MILTON DOUGLAS SKINNER.

Signed in the presence of—
    CHAS. H. RICHES,
    W. J. GILCHRIST.